Figure 1:
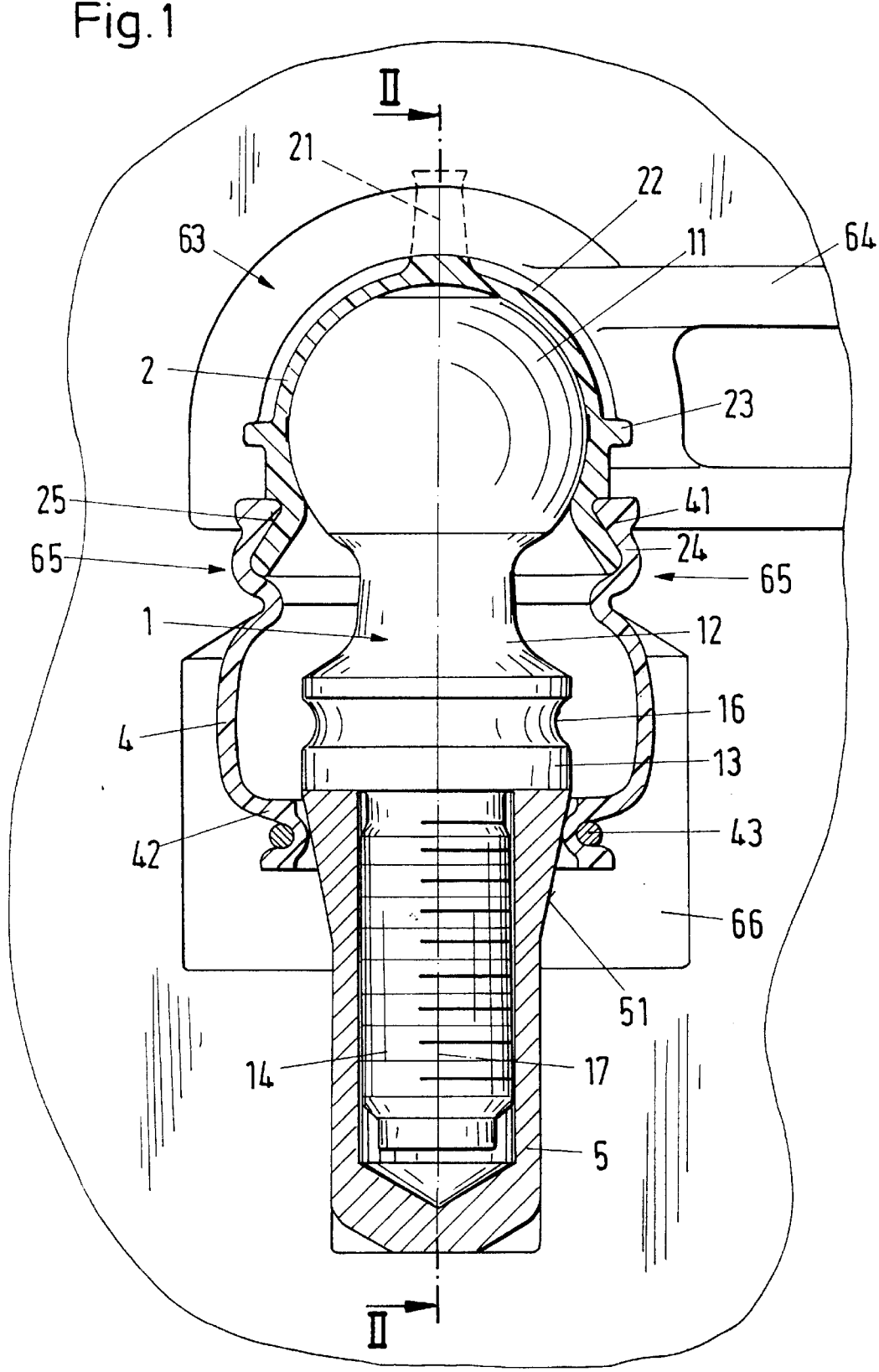

United States Patent
Dorr

[11] Patent Number: 6,139,788
[45] Date of Patent: *Oct. 31, 2000

[54] METHOD FOR MANUFACTURING A BALL JOINT

[75] Inventor: Christoph Dorr, Meerbusch, Germany

[73] Assignee: TRW Fahrwerksysteme GmbH & Co. KG, Dusseldorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/629,339

[22] Filed: Apr. 8, 1996

[30] Foreign Application Priority Data

Apr. 11, 1995 [DE] Germany .................. 195 13 714

[51] Int. Cl.[7] .................................................. B29C 31/06
[52] U.S. Cl. ...................... 264/263; 264/264; 29/898.049
[58] Field of Search ................ 29/898.043, 898.047, 29/898.048, 898.049, 527.1; 403/122, 133, 140, 265, 269; 264/263, 264

[56] References Cited

U.S. PATENT DOCUMENTS

| 2,754,141 | 7/1956 | Latzen ................................. 403/140 X |
| 3,732,606 | 5/1973 | de Germond ....................... 29/527.1 X |
| 5,066,159 | 11/1991 | Urbach ..................................... 403/134 |
| 5,302,336 | 4/1994 | Härtel et al. ............................. 264/263 |
| 5,601,378 | 2/1997 | Fukukawa et al. ................. 403/122 X |
| 5,609,433 | 3/1997 | Pazdirek et al. ............... 29/898.049 X |
| 5,611,635 | 3/1997 | Schütt et al. ....................... 403/122 X |
| 5,615,967 | 4/1997 | Hellon ..................................... 403/133 |
| 5,653,545 | 8/1997 | Moormann et al. ............... 403/133 X |

FOREIGN PATENT DOCUMENTS

| 4006156 A1 | 3/1990 | Germany . |
| 976410 | 11/1964 | United Kingdom . |

*Primary Examiner*—P. W. Echols
*Attorney, Agent, or Firm*—Tarolli, Sundheim, Covell, Tummino & Szabo L.L.P.

[57] ABSTRACT

The invention pertains to a method for manufacturing a ball joint composed of a ball-ended spindle (1), bearing shell (2) and socket, provided with a sealing boot (4) arranged between the socket and ball-ended spindle (1), in particular for a motor vehicle, by means of extrusion coating, with plastic in a split injection mold (6) the ball-ended spindle (1) provided with a bearing shell (2) placed on the ball (11). In order to create a ball joint which can withstand high stress and limit the assembly work required to complete the same, the housing-side opening bead (41) of the sealing boot (4) is positioned on the bearing shell (2), before loading the ball-ended spindle (1) in the injection mold (6), and is located between the bearing shell (2) and housing (3) by means of an extrusion coating.

9 Claims, 3 Drawing Sheets

METHOD FOR MANUFACTURING A BALL JOINT

The invention pertains to a method for manufacturing a ball joint composed of a ball-ended spindle, bearing shell and socket, provided with a sealing boot arranged between the socket and ball-ended spindle, in particular for a motor vehicle, by means of extrusion coating, using plastic in a split injection mold, the ball-ended spindle provided with a bearing shell placed on the ball and also pertains to a bearing shell designated for use with this method.

A method for manufacturing a ball joint composed of a ball-ended spindle, bearing shell and socket is known from DE 4,009,156 A1. In this known method, the ball-ended spindle, after the bearing shell has been placed on the ball, is placed in a split injection mold and extrusion-coated with plastic in order to manufacture the socket. Since plastic is introduced into the mold at high pressure, the danger exists of plastic getting between the bearing shell and the ball of the ball joint, such that the ball joint becomes unserviceable and it is no longer possible to lubricate the shell before injection molding. After checking the performance of the ball joint after being removed from the injection mold, it is further necessary to lubricate the joint and mount the sealing boot, which is arranged between the socket and ball-ended spindle, by inserting the socket-side opening bead in a groove formed in the socket during manufacture and the spindle-side opening bead in a groove formed in the ball-ended spindle and securing said beads with tension rings.

The underlying purpose of the invention is to create a ball joint that can withstand high stress, while avoiding the disadvantages of the known method, and decrease the assembly work necessary to complete the ball joint.

The solution, by means of the invention, to this problem is characterized by the fact that, before placing the ball-ended spindle in the injection mold, the socket-side opening bead of the sealing boot is positioned on the bearing shell and located between the bearing shell and socket by means of an extrusion coating.

Having the housing-side opening bead of the sealing boot already located on the bearing shell before placing the ball-ended spindle in the injection mold results, when placing the ball-ended spindle in the injection mold and with a corresponding shape of the injection mold, in an effective sealing of the cavity incorporated into the injection mold, for manufacture of the socket, with respect to the overall ball joint, since the permanently elastic material of the sealing boot ensures a reliable sealing. At the same time, the housing-side opening bead of the sealing boot is already located on the socket during the manufacture of the latter, eliminating the need for a subsequent expensive assembly process. The method according to the invention consequently eliminates not only the disadvantages of the known method with respect to the danger of leaks, it also avoids part of the subsequent assembly processes as well as the additional use of a tension ring.

According to an additional feature of the invention, the spindle-side opening bead of the sealing boot is located on a cover bushing placed on the threaded stem of the ball-ended spindle before placing the ball-ended spindle in the injection mold. This results in a position of the sealing boot in the injection mold, which position is prolate, tight and reduced in diameter, ensuring that the boot is well positioned as it is placed in the injection mold and, with this, guaranteeing a reliable sealing of the sealing gap between the injection mold and shell and also a secure locating in place between the shell and housing.

In order to facilitate the final assembly of the sealing boot after the ball joint with a socket is removed from the injection mold, the invention further proposes, after the finished ball joint has been removed from the injection mold, to push the spindle-side opening bead, put under tension by means of a tension ring, over a conical transition area incorporated with the cover bushing into a retainer groove incorporated with a collar of the ball-ended spindle. Here, the conical transition area of the cover bushing facilitates a final mounting of the sealing boot.

By locating both opening beads of the sealing boot in place during the injection molding process, an occluded cavity is formed inside the sealing boot, which cavity, according to an additional feature of the invention, can be filled with a lubricant before placing the ball-ended spindle in the injection mold, such that the ball joint manufactured according to the invention is already provided with the necessary lubricant before the completion of its manufacture. This eliminates the need for subsequent introduction of lubricant.

For a preferred embodiment of the method according to the invention, the plastic is introduced by means of a low-pressure injection molding method, preferably a gas internal-pressure injection molding method or a two-component method with a foam component. The low pressure used in this regard not only reduces the danger of leak formation, it also reduces the cost of the mechanical equipment for executing the method.

Since, with the ball joint manufactured according to the invention, the bearing shell and sealing boot result in the ball being 100% covered with the plastic used to form the socket, a reinforced plastic can be used, according to an additional feature of the invention, since reinforcing material embedded in the plastic represents no danger of damaging the spherical bearing surface of the ball. The use of a reinforced plastic increases the load-bearing capacity of the ball joint manufactured according to the invention.

The bearing shell designated for use in the method according to the invention is characterized by the fact that the border of the bearing shell surrounding the opening is provided with an annular bearing surface for the inner border of the housing-side opening bead of the sealing boot. A reliable positioning of the sealing boot on the bearing shell is thereby achieved when the ball-ended spindle provided with a bearing shell is placed in the injection mold.

In a preferred embodiment, the bearing surface is formed by an outwardly flaring extension of the bearing shell, which extension simultaneously forms a limit stop for the pivoting range of the ball-ended spindle.

In order to position, the bearing shell to be extrusion-coated by the socket in the injection mold, the region of the injection mold against which the sealing boot lies, in order to seal the cavity, can be configured, according to an additional feature of the invention, such that said region, in connection with a correspondingly shaped extension of the bearing shell, locates the latter in a defined position in the injection mold. In addition, the outer side of the bearing shell opposite the opening can be provided with a peg-like projection for this purpose.

An additional securing of the bearing shell in the finished socket can be realized, according to the invention, by means of raised portions and/or recesses incorporated into the outer side of the bearing shell. The raised portions and/or recesses are preferably in the form of ribs on at least one parallel of latitude of the bearing shell, thereby preventing the bearing shell from becoming off-center with respect to the socket in the direction of the axis of the ball-ended spindle. Additional rib-like raised portions and/or recesses are used on at least one meridian of the bearing shell in order to prevent the bearing shell from twisting with respect to the socket around the central longitudinal axis of the ball joint and in order to stiffen the bearing shell, preventing from being deformed, in particular, in the pole surface region of the ball, by injection pressure as the housing is being injection molded.

Figure 2:
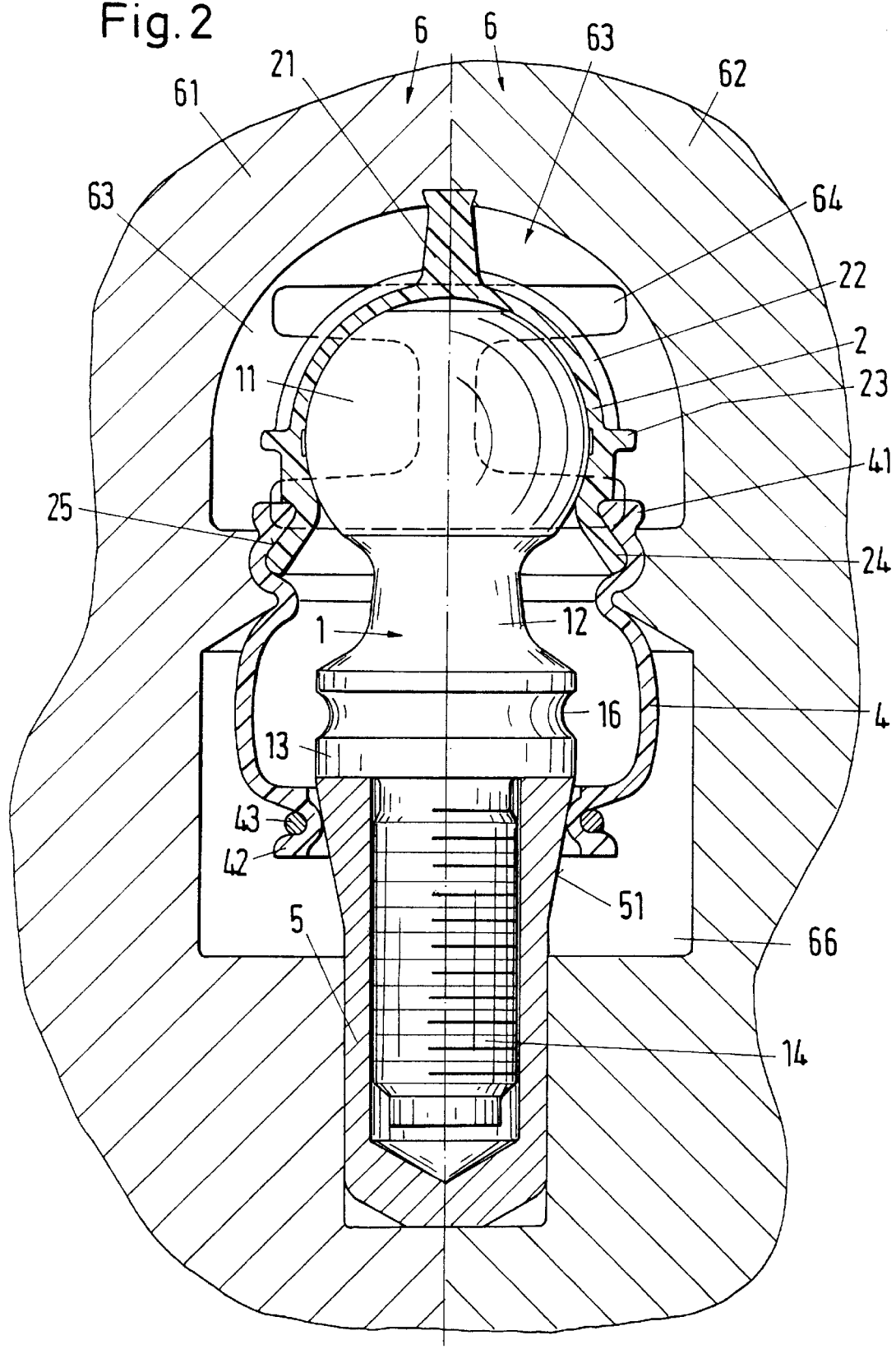
Figure 3:
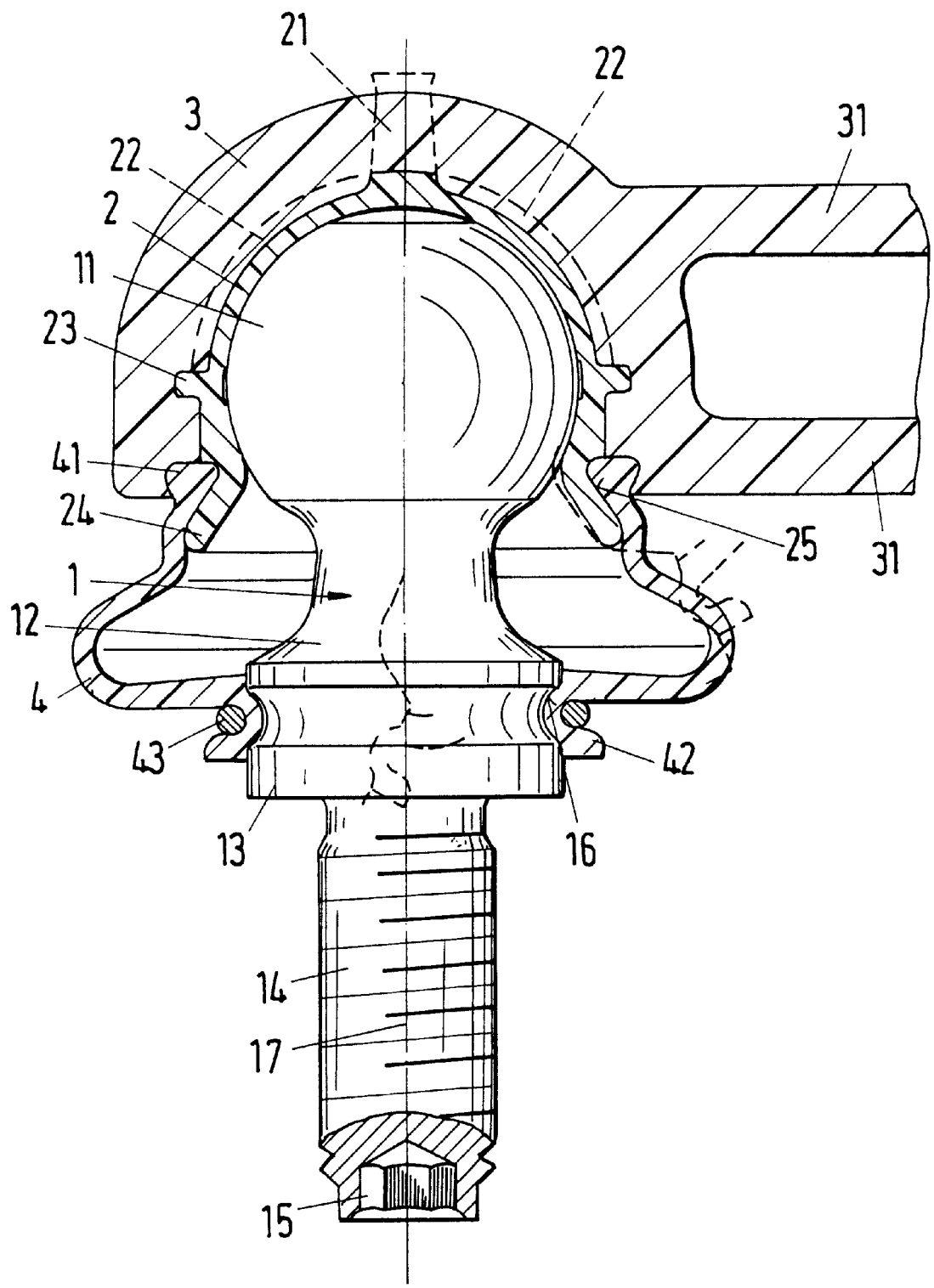

The figure represents one embodiment of a ball joint manufactured in accordance with the method according to the invention and with the use of a bearing shell according to the invention and, in fact, shows:

FIG. 1: a longitudinal section of a ball-ended spindle provided with a bearing shell and sealing boot and loaded in the lower half of an injection mold before manufacture of the socket;

FIG. 2: a cross section of the injection mold with ball-ended spindle along line II—II in FIG. 1; and FIG. 3: a longitudinal section of the finished ball joint.

The finished ball joint, according to FIG. 3, is composed of a ball-ended spindle (1), a bearing shell (2), a socket (3), incorporated with the chassis strut (31) and a sealing boot (4).

The ball-ended spindle (1) comprises a ball (11), which, by means of a transition area (12) changes into a cylindrical collar (13), which is incorporated with a threaded stem (14). A hex socket (15) is formed, as a wrench surface, at the end of the threaded stem (14). The collar (13) is provided with an annular retaining groove (16).

The bearing shell (2), which serves to carry the ball (11) of the ball-ended spindle (1), is held in an interlocking manner by the socket (3). For this purpose, the equator of the spherical outer surface of the bearing shell (2) is provided with an annular raised portion (23), which prevents the bearing shell (2) from becoming off-center in the direction of the axis of the ball-ended spindle (17), and is also provided with rib-like raised portions (22) along the meridian of the surface of the bearing shell, which prevent the bearing shell (2) from twisting in the housing around the axis of the ball-ended spindle (17).

These ribs also serve to stiffen the bearing shell (2) in order to prevent deformation caused by the high pressure and high temperature of the liquid plastic of the former during injection molding-particularly in the region of the flattened polar region of the ball (11).

The border surrounding the opening of the bearing shell (2) is provided with an outwardly flaring extension (24), the conical inner surface of which serves as a limit stop for limiting the pivoting range of the ball-ended spindle (1). The maximum pivoting angle of the ball-ended spindle (1) with respect to the socket (3) and, with this, the bearing shell (2) is indicated by the dashed line in the central portion of FIG. 3.

The outer side of the extension (24) forms an annular bearing surface (25) for a housing-side opening bead (41) of the sealing boot (4), the spindle-side opening bead (42) of which is placed in the retaining groove (16) of the ball-ended spindle (2) and, in fact, with the use of a tension ring (43).

The first step for manufacturing the ball joint described above is to place the bearing shell (2) on the ball (11) of the ball-ended spindle (1). Afterwards the housing-side opening bead (41) is placed on the annular bearing surface (25) of the bearing shell (2). The spindle-side opening bead (42) of the sealing boot (4) reaches, in this regard, a conical transition area (51) of a cover bushing (5), which has been pushed over the threaded stem (14) of the ball-ended spindle (1) up to the limit stop at the bottom side of the collar (13); this tightly stretches and reduces the diameter the same such that it can reliably permit a loading in the injection mold (6) and also fulfills the sealing task by means of the housing-side opening bead (41) of the sealing boot (4).

The ball-ended spindle (1), bearing shell (2), sealing boot (4) and cover bushing (5) are placed, in this state, in a two-part injection mold (6). The two halves (61,62) of this injection mold (6) can be recognized in cross section in FIG. 2. FIG. 1 shows a top view of the bottom half (61) of the injection mold (6).

Both drawings reveal that the injection mold (6) features a cavity (63) which encloses the bearing shell (2), which cavity changes into a cavity (64) corresponding to the outer contour of the chassis strut (31) (see FIG. 1). Both cavities (63,64) are sealed by means of the elastic material of the sealing boot (4) with respect to the extension (24) of the bearing shell (2). In this region, the sealing boot (4) is completely enclosed by a corresponding supporting surface (65) of the two halves (61,62) of the injection mold (6). This supporting surface (65) is formed such that, in connection with a correspondingly formed extension (24) of the bearing shell (2), it not only seals the cavities (63,64) by pinching the sealing boot (4), but it also simultaneously locates the bearing shell (2) in a defined position in the injection mold (6). This locating can be supported by a peg-like projection (21) in the outerlying polar region of the bearing shell (2). A recess (66) in the injection mold (6), cylindrical for this embodiment, accommodates the part of the sealing boot (4) which is pinched between the injection mold (6) and bearing shell (2), is adjacent to the opening bead (41), is stretched by the cover bushing (5) and is reduced in diameter, up to the spindle-side opening bead (42).

After closing the injection mold (6), it is preferable for glass-fiber-reinforced plastic to be introduced into the cavities (63,64) of the injection mold (6) by means of a low-pressure injection molding method, preferably according to a gas internal-pressure injection molding method or according to a two-component method with a foam component, such that the socket (3) is manufactured integrally with the chassis strut (31). For this manufacture, the housing-side opening bead (41) of the sealing boot (4) is trapped between the bearing shell (2) and the socket (3). In addition, the rib-like and annular raised portions (22,23) of the bearing shell (2) result in an interlocking locating the bearing shell (2) in place inside the socket (3).

After opening the injection mold (6), the ball joint is removed in an almost completely assembled state. It is only necessary to push the spindle-side opening bead (42), lying on the conical transition area (51) of the cover bushing (5), over the conical transition area (51), into the retaining groove (16) of the ball-ended spindle (1). Since the space enclosed by the sealing boot (4) can be filled with a lubricant before placing the ball-ended spindle (1) in the injection mold (6), the ball joint is ready to mount after removal of the cover bushing (5).

List of Reference Characters (1) Ball-ended spindle
(11) Ball
(12) Transition area
(13) Collar
(14) Threaded stem
(15) Hex socket
(16) Retaining groove
(17) Center longitudinal axis
(2) Bearing shell

(21) Projection
(22) Raised portion
(23) Raised portion
(24) Extension
(25) Bearing surface
(3) Socket
(31) Chassis strut
(4) Sealing boot
(41) Opening bead
(42) Opening bead
(43) Tension ring
(5) Cover bushing
(51) Transition area
(6) Injection mold
(61) Half
(62) Half
(63) Cavity
(64) Cavity
(65) Supporting surface
(66) Recess

What is claimed is:

1. In a method of manufacturing a ball joint for a motor vehicle, the steps of:
   providing a spindle with a spherically shaped end portion;
   placing a bearing shell on the spindle;
   providing a sealing boot having a housing-side opening bead at one end and a spindle-side opening bead at the other end and having an interior;
   providing a split injection mold having a mold cavity;
   positioning the housing-side opening bead of the sealing boot on the bearing shell to seal the interior of the bearing shell;
   placing a cover bushing on a threaded stem of the spindle;
   locating the spindle-side opening bead of the sealing boot on the cover bushing to stretch and reduce the diameter of the sealing boot;
   placing an assembly of the spindle, bearing shell, cover bushing, and sealing boot in the mold cavity in the split injection mold after performing said step of positioning the housing-side opening bead of the sealing boot on the bearing shell; and, thereafter,
   injecting plastic into the mold cavity in the split injection mold to form a plastic molded socket for the ball joint;
   said step of injecting plastic into the mold cavity including the step of injecting plastic against the housing-side opening bead of the sealing boot.

2. A method as set forth in claim 1 including the steps of putting a tension ring on the spindle-side opening bead of the sealing boot, removing the finished ball joint from the injection mold, and pushing the spindle-side opening bead and the tension ring over a conical transition area incorporated with the cover bushing into a retaining groove in a collar of the spindle.

3. A method as set forth in claim 1 including the step of filling the sealing boot with a lubricant prior to performing said step of placing the spindle in the injection mold.

4. A method as set forth in claim 1 wherein said step of placing the assembly of the spindle, bearing shell and sealing boot in a mold cavity in a split injection mold includes the step of pinching the spindle-side opening bead of the sealing boot between the bearing shell and the injection mold to seal the interior of the sealing boot.

5. A method as set forth in claim 4 wherein said step of providing a split injection mold comprises the step of providing a split injection mold having a supporting surface which cooperates with an extension of the bearing shell for sealing the mold cavity by means of the sealing boot.

6. A method as set forth in claim 1 wherein said step of injecting plastic into the mold cavity comprises the step of injecting plastic by a gas internal-pressure injection molding method.

7. A method as set forth in claim 1 wherein said step of injecting plastic into the mold cavity comprises the step of injecting a fiber reinforced thermoplastic.

8. A method of manufacturing a ball joint comprising the steps of:
   providing a spindle with a spherically shaped end portion;
   placing a bearing shell on the spindle;
   providing a sealing boot having a housing-side opening bead at one end and a spindle-side opening bead at the other end and having an interior;
   providing a split injection mold having a mold cavity;
   positioning the housing-side opening bead of the sealing boot on the bearing shell to seal the interior of the bearing shell;
   placing a cover bushing on a threaded stem of the spindle;
   locating the spindle-side opening bead of the sealing boot on the cover bushing to stretch and reduce the diameter of the sealing boot;
   placing an assembly of the spindle, bearing shell, cover bushing, and sealing boot in the mold cavity in the split injection mold after performing said step of positioning the housing-side opening bead of the sealing boot on the bearing shell; and, thereafter,
   injecting plastic into the mold cavity in the split injection mold to form a plastic molded socket for the ball joint;
   said step of injecting plastic into the mold cavity including the step of injecting plastic against the housing-side opening bead of the sealing boot.

9. A method of manufacturing a ball joint for a motor vehicle, comprising the steps of:
   providing a spindle having a threaded stem at one end thereof, a ball having a spherical outer surface at a second end thereof, and a mid-section interconnecting said ball and said threaded stem, wherein said mid-section has an annular groove;
   providing a bearing shell having an annular projection at one end thereof, a spherical inner surface, and a spherical outer surface defining an outer diameter;
   providing a flexible sealing boot having an interior defined by a housing-side opening annular bead at a first end of said flexible sealing boot, a spindle-side opening annular bead at a second end of said flexible sealing boot, and a mid-section interconnecting said housing-side opening annular bead and said spindle-side opening annular bead, wherein said mid-section of said flexible sealing boot has an outer surface defining an original outer diameter;
   providing a split injection mold having an inner surface defining a spherical cavity with a diameter that is greater than said outer diameter of said bearing shell, and a recess that has an inner diameter that is less than said outer diameter of said mid-section of said flexible sealing boot;
   providing a cover bushing having an opened end, a closed end, and an outer surface;

placing said bearing shell on said ball such that said spherical inner surface surrounds and contacts said spherical outer surface;

positioning said housing-side opening annular bead around and in contact with said annular projection;

passing said threaded stem through said opened end and into said cover bushing, thereby surrounding said threaded stem with said cover bushing;

positioning said spindle-side opening annular bead around and in contact with said outer surface of said cover bushing, thereby axially stretching said sealing boot and reducing said outer diameter of said mid-section of said flexible sealing boot from said original outer diameter to a diameter that is less than said diameter of said cavity, and thereby providing an assembly comprising:
  (i) said spindle having its ball surrounded by and in contact with said bearing shell, and its threaded end surrounded by said cover bushing, and
  (ii) said flexible sealing boot having its housing-side opening annular bead surrounding and being in contact with said annular projection, and its spindle-side opening annular bead surrounding and being in contact with said cover bushing;

placing said assembly into said mold, such that said ball is received within said cavity and said mid-section of said flexible sealing boot is received within said recess;

injecting plastic into said cavity against said outer surface of said bearing shell and said housing-side opening annular bead while preventing said plastic from entering said recess and said interior of said flexible sealing boot;

causing said plastic to solidify, thereby forming a plastic socket integrally attached to said bearing shell and said housing-side opening annular bead;

removing said assembly and said integrally attached plastic socket from said split mold;

forcing said spindle-side opening annular bead from said cover bushing and into said groove, thereby causing said mid-section of said flexible sealing boot to return to said original outer diameter; and removing said cover bushing from said assembly.

* * * * *